United States Patent [19]

Rutherford

[11] Patent Number: 5,028,302
[45] Date of Patent: Jul. 2, 1991

[54] PURIFICATION OF CHLOR-ALKALI MEMBRANE CELL BRINE

[75] Inventor: John Rutherford, Punta Gorda, Fla.
Raymond W. Ver Hove Hoeue, Houston, Tex.

[73] Assignee: Texas Brine Corporation, Houston, Tex.

[21] Appl. No.: 437,177

[22] Filed: Nov. 16, 1989

[51] Int. Cl.$^5$ .............................................. C25B 25/00
[52] U.S. Cl. ........................................ 204/98; 204/128; 423/499; 423/551; 23/297; 23/298; 23/302 T
[58] Field of Search .................. 204/98, 128; 423/499, 423/551; 23/296, 297, 298, 302 T

[56] References Cited

U.S. PATENT DOCUMENTS

| | | | |
|---|---|---|---|
| 1,435,727 | 11/1922 | Morse | 23/298 |
| 4,556,463 | 12/1985 | Minz et al. | 204/98 |
| 4,565,612 | 1/1986 | Fry | 204/98 |
| 4,586,993 | 5/1986 | O'Brien | 204/98 |
| 4,747,917 | 5/1988 | Reynolds et al. | 204/98 |

FOREIGN PATENT DOCUMENTS 3216418 11/1983 Fed. Rep. of Germany ...... 204/128

OTHER PUBLICATIONS

O'Brien, T. F. Control of Sulfates in Membrane Systems, pp. 326–349.

Primary Examiner—John F. Niebling
Assistant Examiner—Kathryn Gorgos
Attorney, Agent, or Firm—Peter F. Casella

[57] ABSTRACT

This invention relates to methods and systems for purifying brine for electrolysis in chlor-alkali cells, especially membrane cells by reducing the sulfate ion concentration, while at the same time minimizing the concentration of other undesireable ions such as calcium and chlorate. The methods and systems employed are unique combinations of refrigeration and crystallization, and brine recirculation techniques in the systems for electrolyzing brine.

11 Claims, 2 Drawing Sheets

PURIFICATION OF CHLOR-ALKALI MEMBRANE CELL BRINE

BACKGROUND OF THE INVENTION

Caustic soda and chlorine are produced concurrently with hydrogen by the electrolysis of an aqueous solution of sodium chloride in various types of electrolytic cells. Membrane cells using perfluorinated ion exchange membranes are the latest state of the art electrolytic cells utilized in the production of chlorine and caustic soda.

While membrane cells offer significant advantages over mercury cells and diaphragm cells, namely cell efficiency, power consumption, quality of products, and overall economics; these membrane cells require much purer brine than their predecessors. For example, calcium and magnesium content of the feed brine to the membrane cells must be reduced to the low ppb range.

Furthermore, the sulfate ion concentration has become very important in the feed brine to membrane cells, especially as the membranes are improved in composition to enhance their performance, because high concentrations of sulfate ions can cause premature failure of the membranes, both mechanically and in their separation performance. A typical feed brine sodium sulfate specification for membrane cells is below 7.0 gpl (4.73 gpl sulfate ion). Calcium sulfate impurity in many rock salts is greater than the 4.73 gpl sulfate ion specification. Further, only about 50% of the sodium chloride fed to the cells is converted, and the other 50% exits from the cells as depleted brine containing the sodium sulfate that was in the original cell brine feed.

The depleted brine cannot be thrown away because of economic and environmental considerations; hence, it must be resaturated, treated and returned to the cells. Since new calcium sulfate is dissolved in the resaturation process, the total sulfate ion concentration will keep increasing with each recycle step. The same is true if the cell plant is located near, or in pipe line communication with, the brine wells. Once the sodium sulfate content of the feed brine exceeds 7.0 gpl, the sulfate ions are considered to be detrimental to cell efficiency and membrane life. Thus, steps must be taken to eliminate or reduce the sulfate ions picked up in the process of dissolving salt or built up in the depleted brine sent to the resaturation process to make brine for electrolysis.

PRIOR ART

Various solutions to the problem of removal of sulfate ions from brine employed in chlor-alkali electrolysis have been proposed in the prior art or have actually been used in industry.

One solution to the problem is to supply purified evaporated salt to the cell plant. This may be supplied to the membrane cell plant by salt manufactures or the plant may choose to receive rock salt, brine or solar salt and install its own evaporators to produce purified evaporated salt. In this case, the sodium sulfate formed in the brine treatment step is removed from the multiple effect evaporators in the form of bitterns (brine containing 40-50 gpl sodium sulfate). The salt crystals formed in the evaporators are centifuged and washed to provide sodium chloride crystals containing as little as 400 ppm sodium sulfate.

The evaporation step may be eliminated by chemical treatment of the brine prior to conventional brine treatment. Conventional primary brine treatment systems include means for treating the brine with caustic soda (or cell liquor from the cathode compartment of the membrane cell) sodium carbonate or any other additives that may be necessary to eliminate impurities such as calcium, magnesium, iron, etc. The impurities are removed in a thickener and a filter. The additional chemical treatment may be accomplished with either barium chloride or barium carbonate or calcium chloride. Barium sulfate formed in the reaction is highly insoluble in sodium chloride brine and this would be the preferred route were it not for the high cost of barium salts and strict environmental limitations on disposal of barium sludges.

Calcium chloride is cheaper and does not cause the environmental problems that barium salts do. Unfortunately, calcium sulfate is a great deal more soluble than barium sulfate, and the brine leaving the chemical treatment step will increase in calcium sulfate concentration and require more treatment chemicals in the ensuing conventional brine treatment step, to reduce the sulfate content of the brine.

Usually, the additional calcium chloride treatment will result in a sodium sulfate content of less than 7.0 gpl after conventional brine treatment, but the process requires good balance between the sulfate content and the amount and cost of calcium chloride and sodium carbonate used to precipipate calcium sulfate and calcium carbonate. Because of these considerations, treatment to remove sulfate ions with calcium chloride can require considerable equipment, treatment chemicals and sludge handling and disposal.

Another method of removing sulfate ions from the finished brine that has been purified by employing the various foregoing techniques is the use of anionic ion exchange resin beds that selectively remove the sulfate ion. This additional process step involves additional treatment chemicals, equipment and costs.

Various patents have been issued specific to the removal of sulfates from brine to be electrolyzed in chlor-alkali membrane cells.

U.S. Pat. No. 4,556,463 issued to Minz and Vajna on Dec. 3, 1985 shows the use of an anion exchange medium to remove the sulfate ion and then returning the solution to the cell. This patent refers to a book by J. S. Sconce entitled Chlorine which is part of the American Chemical Society Monograph Series for information on electrolysis and brine purification.

U.S. Pat. No. 4,565,612 issued to Fry on Jan. 21, 1986 discloses a process for reducing sulfate ion concentration in an aqueous solution comprising sodium hydroxide obtained by electrolysis of salt by adding sodium carbonate or bicarbonate and removing the insoluble salts. This patent discloses a prior art method of separating sodium sulfate from a hot caustic electrolytic cell effluent solution, having a concentration of about 20 to 35 percent by weight of sodium hydroxide, by directing it from an evaporator to a heat exchanger where it is cooled to about zero degrees centigrade to precipitate out sodium sulfate decahydrate.

U.S. Pat. No. 4,586,993 issued to O'Brien on May 6, 1986 shows the use of calcium salt addition to form the precipipate of calcium sulfate followed by an ion exchange column to assist in the removal.

U.S. Pat. No. 4,747,917 issued to Reynolds, Breaux and Reed on May 31, 1988 discloses a process for removing sulfate ions from brine in a five step process which include adding salt to depleted brine, before treating it to remove the sulfate in the crystallizer. This patent mentions a prior art method of reducing sulfate ion concentration by forming Glauber's salt (sodium sulfate decahydrate) and requiring additional energy expenditures by going through heating and cooling cycles to remove it.

In addition to the foregoing prior art an article published in the 1986 Chlorine Institute book entitled Modern Chlor-Alkali Technology, Volume 3, by T. F. O'Brien entitled Control of Sulfates in Membrane-Cell Brine Systems on pages 326–349 reviews the then current state of the art on sulfate removal from membrane cell brine.

OBJECTS OF THE INVENTION

It is an object of this invention to provide methods and systems for purifying brine for electrolysis in chlor-alkali cells.

It is a further object of this invention to provide methods and systems for the removal of sulfate ions from brines for use in membrane cells employing florinated ion exchange membranes.

It is still a further object of this invention to provide methods and systems for lowering the concentration of sulfate ions in membrane cell plant installations which are in pipeline communication with brine wells, which transmit freshly mined brine in one line and return depleted brine for resaturation in an adjacent line.

It is another object of this invention to lower the concentration of sulfate ions in depleted brine from membrane cells which has built up concentrations of sulfate ions above 7.0 gpl to below the current membrane specification of 6.0 to 7.0 gpl, which cells are producing chlorine, caustic soda and hydrogen, so that the brine may be recycled to the cells for further electrolysis, without causing loss of efficiency or mechanical integrity of the membranes, and which at the same time is economic and also allows for the removal of other undesireable impurities from the brine.

BRIEF DESCRIPTION OF THE INVENTION

These and other objects are accomplished by applicant's invention comprising methods and systems employing a unique combination of refrigeration and crystallization, and brine recirculation techniques in the systems for making and electrolyzing brine, as more fully described and claimed hereinafter.

In order that this invention may be more readily understood, it will be described with respect to certain preferred embodiments, especially as contained in the attached drawings, and examples given below; however, it is to be understood that these embodiments are not to be construed as limiting the invention except as defined in the appended claims.

BRIEF DESCRIPTION OF THE DRAWINGS

FIG. I is a flow sheet of a brine well, brine supply system in accordance with this invention for making and supplying high purity brine to a typical membrane cell plant.

FIG. II is a flow sheet of the recuperative refrigeration and crystallization system of this invention used on the raw brine that has been diluted to a desired concentration before entering the refrigeration and crystallization zones.

DETAILED DESCRIPTION OF THE INVENTION

Figure 1:
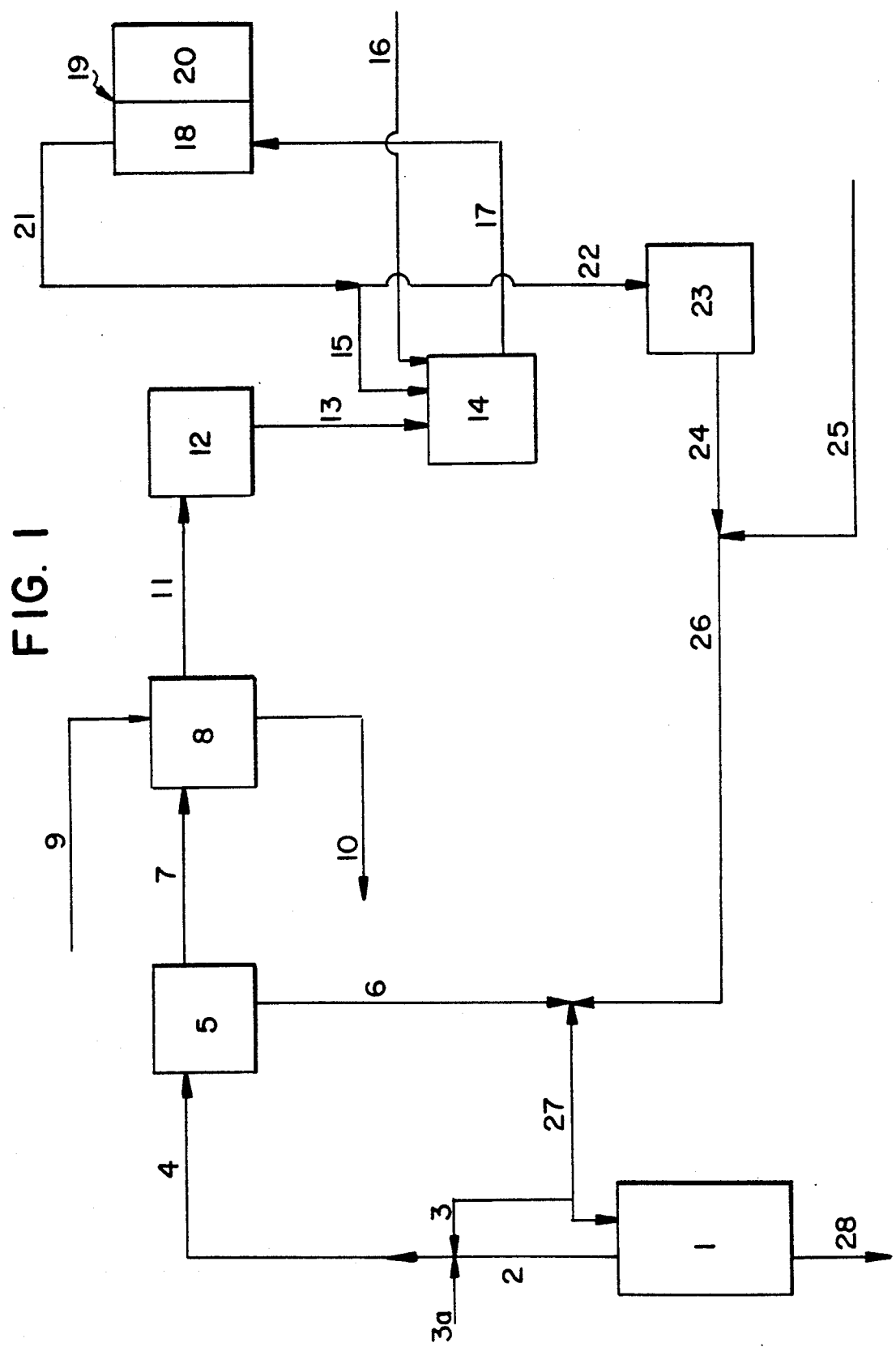
Figure 2:
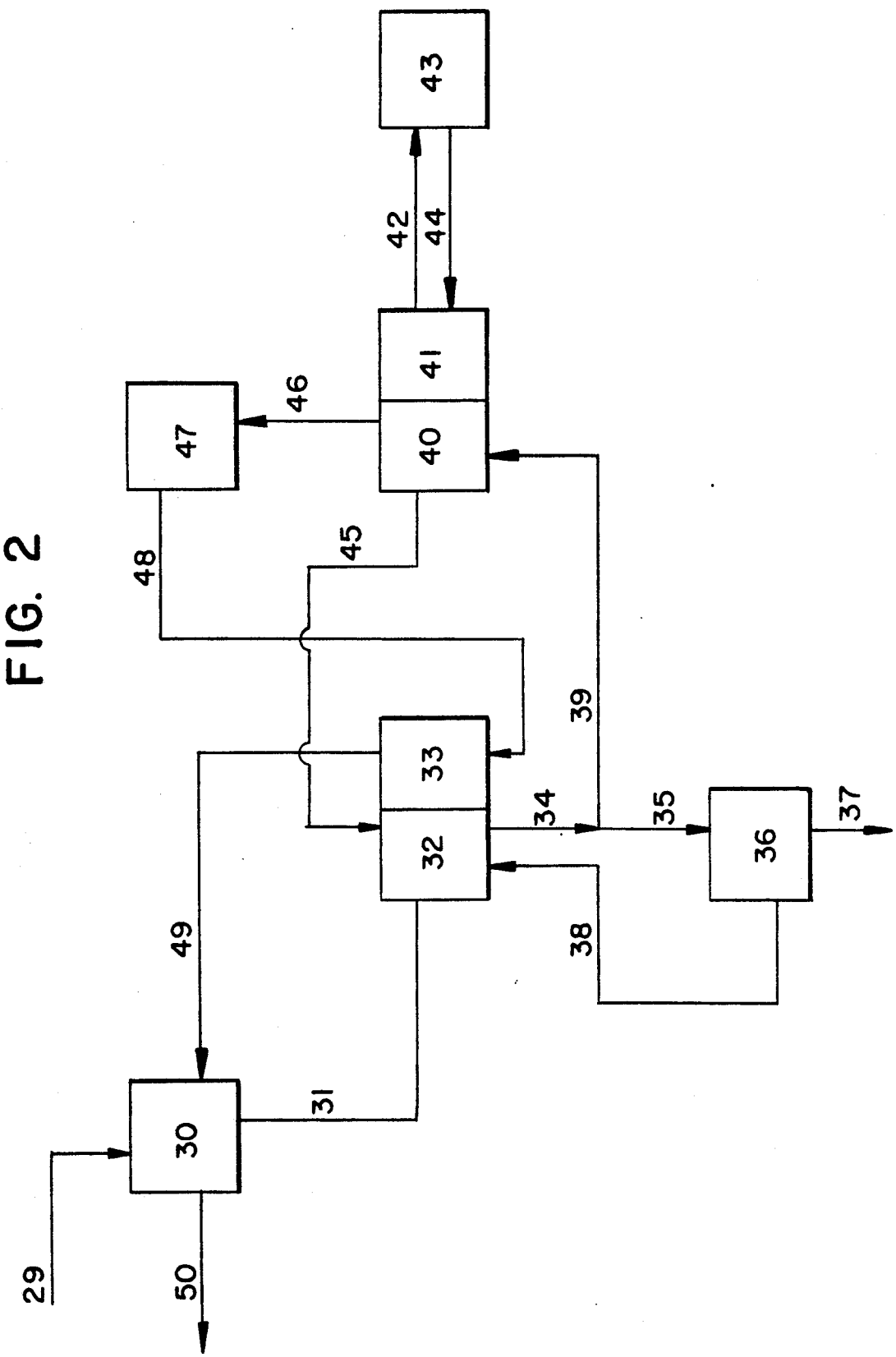

I have found methods and systems for employing unique combinations of refrigeration and crystallization, and brine recirculation techniques in systems to make brine for electrolysis, which reduce the sulfate ion concentration so that it may be used in chlor-alkali membrane cells thereby prolonging the life and efficiency of the membranes.

The sulfate ion concentration can be reduced in raw brine or brine that has been purified by the conventional primary treatment systems, to as low as 3.6 gpl sulfate ion content, and even lower, by employing the combination of refrigeration and crystallization, and brine recirculation, in the purification systems as taught herein, thereby eliminating the need for the evaporation step or the calcium chloride treatment used in the prior art purification processes.

Furthermore, when employing the unique combination of refrigeration and crystallization, and brine recirculation findings of this invention, on depleted brine containing 7.0 gpl and more of sodium sulfate, which brine when resaturated with salt, is unsatisfactory for recycling as such to membrane cells for further electrolysis, the sodium sulfate concentration in the brine can be reduced to 5.3 gpl, and lower, which is well below the current specifications of 6.0–7.0 maximum sodium sulfate content.

In addition, best results in economy and performance are realized when the combination of refrigeration and crystallation, and brine recirculation system of this invention are used in combination with those membrane cell installations that are in pipeline communication with brine wells. For example, in such installations, freshly mined brine is pipelined to the membrane cell installation in one line and an adjacent return line takes the depleted brine back to the wells for resaturation with salt. In this system, process makeup water is added to the dechlorinated, depleted brine to replace the water lost in the electrolysis process in the membrane cells and water lost to the cavity in the brine well created by the continuing solution of the salt (i.e. the brining process). The brine exiting from the wells usually contains 25.5 to 26.5 per cent sodium chloride. It also contains calcium sulfate, sodium sulfate and other impurities such as magnesium salts. Water and/or depleted brine is added to the raw brine exiting from the wells to bring its concentration to under 24.4% sodium chloride content such that when the Glauber's salt is precipitated in the crystallization process the concentration of sodium chloride in the product brine will be essentially saturated at the crystallization temperature selected (typically 12 to 14 degrees Fahrenheit). At this temperature, the sodium chloride concentration will be about 24.4% sodium chloride, and the sulfate ion concentration in solution will be about 3.6 gpl sulfate ion.

The Glauber's salt crystals are separated from the purified liquor by conventional means and the product brine filtered, if necessary, to assure the desired sulfate ion concentration. The Glauber's salt is then added to the depleted brine being returned to the wells where re-dissolution of the Glauber's salt occurs. Since essentially all the sulfate ions leaving the well in the raw brine are eventually recycled to the wells as Glauber's salt and in the depleted brine, the level of sulfate ions in the brine contained in the wells will build up until the ions lost to the void space created by dissolving salt are equal to the sulfate ions contained in the soluble calcium sulfate in the raw brine leaving the wells. Depending on the solubility coefficients of the particular wells and the alkalinity of the raw brine, this equilibrium will be on the order of 9.6 gpl sulfate ions. Due to this high level of sulfate ions in the raw brine, the calcium ion concentration will be very low. This results in significant reductions in the sodium carbonate required in the conventional brine treatment process and in the solids to be washed and disposed of, all in accordance with savings to be realized by this invention. If the sodium chloride content of the purified brine being fed to the cells is about 24.4% sodium chloride, as opposed to 25.0 to 26.0 percent with other systems, the feed brine rate to the cells can be increased somewhat to maintain an exit brine strength of about 17% sodium chloride.

While the location discussed for the sulfate reduction process of this invention is on the raw brine being introduced into the system, the sulfate reduction process of this invention may be located after the conventional primary brine treatment process, if preferred. Any of the conventional brine treatment processes currently in use may be employed. These processes include means for treating the brine with caustic soda, (or cell liquor from the cathode compartment of the cells) sodium carbonate or other chemicals that may be needed to eliminate or reduce impurities such as calcium, magnesium, iron, and other materials that may be objectional in the brine to be used in chlor-alkali electrolysis. Furthermore any of the secondary brine treatment processes associated with membrane cell operations may be utilized, such as ion exchange resins using chelating agents.

Where brine wells are located at or in the vacinity of the membrane cell installation, for example in pipeline communication within one hundred and fifty miles or so, there are exceptional economic advantages to be realized by using the methods and systems of this invention.

Referring to the drawings which were briefly described above; specifically FIG. I: 1 represents the brine wells employed to produce the raw brine, 2, exiting from the wells. The raw brine may be sent to the refrigeration and crystallization system, 5, as such. Preferably, however, the raw brine is diluted by water, 3a, or by depleted brine, 3, which is usually about 17% sodium chloride content. Either diluent is added to the concentrated raw brine obtained from the well head to prevent crystallization during the pre-cooling step, and to prevent crystallization of sodium chloride dihydrate during the Glauber's salt crystallization step. The slightly diluted raw brine, 4, flows to the refrigeration and crystallization system, 5, where the final crystallization temperature is in the order of 6 to 20 degrees Fahrenheit. If a lower concentration of sulfate ions is desired in the product brine, the final crystallization temperature employed is at the lower end of the range, and may be lowered towards the end of the crystallization step, if necessary, to meet the required specification. Centrifuged, filtered or settled Glauber's salt crystals, 6, are added to the depleted brine stream en route to the wells, 27, for reconstitution. The brine exiting the refrigeration and crystallization system 5, is filtered (or separated in any conventional manner) and filtered brine, 7, is then fed to the conventional brine treatment system, 8, where sodium carbonate and sodium hydroxide are added as required to precipitate calcium, magnesium, and iron ions. Solids precipitated, 8, in the conventional brine treatment system are removed, 10, and handled in a conventional manner. The so treated brine, 11, then flows to a typical secondary brine treatment system, 12, where it is further purified to reduce metal impurities to the satisfactory level established for operating membrane cells. Purified brine, 13, exiting the secondary treatment system, 12, then flows to a typical membrane cell anolyte system, 14, where it is mixed with recirculating brine, 15, from the anolyte compartment, 18, and hydrochloric acid, 16, which is added as required. The mixed acidified brine, 17, flows to the anolyte compartment, 18, of the membrane cells, 19. The catholyte compartment, 20, produces sodium hydroxide and hydrogen, while the anolyte compartment produces chlorine. For purposes of simplification, the chlorine, sodium hydroxide, and hydrogen streams are not shown on this flow sheet.

A portion of the existing anolyte brine, 21, is diverted, 22, to the dechlorination system, 23, where chlorine and hypochlorite are removed from the brine and the pH adjusted to make the depleted brine fit to return to the wells, since a high pH, up to 11+ is desired for optimum operation of the brining process in the wells, depending on the specific characteristics and geographic location of the wells. Conventional dechlorination systems may be employed, such as acidifying with hydrochloric acid in sufficient amount to react with the hypochlorite or by blowing the brine with air or flashing off the chlorine at reduced pressure. Since water has been lost in the void space created by the salt being dissolved in the well, (that is during the brining process), and water has been consumed and lost in the electrolytic process in the membrane cells, make-up water, 25, is added to the depleted, dechlorinated anolyte brine stream, 24, returning to the wells. Depending on the hardness of the make-up water source, this water may be deionized if desired, especially if it would add undesireable impurities to the system. The pH of the dechlorinated, depleted brine being returned to the wells may be raised by addition of sodium hydroxide; and if it is desired to increase the equilibrium level of sulfate ions in the wells, to supress the solution of sulfate ions from the salt in the mine being dissolved; sodium sulfate or sodium carbonate may also be added to the stream, 25, where they dissolve. Glauber's salt crystals, 6, separated from the refrigeration and crystallization system, 5, are added to the dechlorinated, depleted, diluted brine stream, 26, where they dissolve and the mixture, 27, is then returned to the wells, 1. During the process of dissolving salt in the well, that is during the brining process, some of the water, sodium chloride and sodium sulfate is lost, 28, to the void spaces created as more salt is dissolved.

Thus, in accordance with this invention, essentially all the sulfate ions leaving the brine wells in the raw brine, 2, are returned back to the wells to maximize the concentration of the sulfate ions in the wells, thereby supressing the solution of new calcium sulfate from the salt mine during the brining process. This is further enhanced by the addition of sodium carbonate and/or sodium sulfate and by maintaining a high pH, such as above 7 to 11+, depending on the geographic location and composition of the salt dome, in the brine being returned to the wells. Thus the sulfate ions are reduced to an acceptable level in the refrigeration and crystallization system of this invention, before the brine is introduced into the membrane cells. In accordance with this invention, the concentration of calcium sulfate in the raw brine leaving the wells is minimized by the high sulfate ion concentration thereby allowing the brine to be further processed so that the sulfate ions in the brine are reduced to level below the specification required for efficient operation of membrane cells with prolonged membrane life. Furthermore, a significant cost savings is realized by employing the systems of this invention because the refrigeration power requirement of the refrigeration and crystallization system will be in the order of 25 to 30 kilowatt-hours per ton of sodium chloride consumed in the membrane cells. At this power consumption, the systems of this invention are considerably more economic in the combined use of energy and treatment chemicals than any alternative system currently in use. Also, this invention significantly reduces the amount of sludges to be handled and disposed of. For example, at least one and a half to four times less sludge is handled by the systems of this invention as compared to those presently in use, depending on the process they use for chemical removal.

FIG. II illustrates a mode of the refrigeration and crystallization system of this invention, in this case employing multi-crystallizers, for the sulfate ion reduction process step. Slightly diluted raw brine, 29, is directed thru a recuperative cooler, 30, (that is a cooler which is capable of recovering the heat and cooling values being exchanged) where it is cooled to approximately 30 degrees Fahrenheit by cold product stream, 49. The cooled brine then flows, 31, to a typical high magma density crystallizer, 32. This crystallizer may consists of a circulation tank equipped with a large circulating pump and a shell and tube heat exchanger, 33, all designed to control the magma density and crystal growth of the Glauber's salts. The crystallizer system is properly equipped with conventional equipment and instrumentation to maintain the proper balance of crystals in the crystallizer. Cooling for the crystallizer may be provided by the 6 to 14 degree Fahrenheit product stream, 48, from the final crystallizer. The partially cooled slurry stream, 34, exits from the crystallizer body, 32, and a portion of the stream, 35, is sent to the centrifuge, filter or settler, 36, where the desired amount of sodium sulfate is removed as Glauber's salt, in stream, 37. Centrate, 38, is returned to the primary crystallizer, 32. The main exit stream, 39, flows to the second crystallizer, 40, where it is cooled to 6 to 16 degrees Fahrenheit in the heat exchanger, 41, using conventional refrigeration, 42, 43, 44.

A portion of the slurry in the final crystallizer is sent back, 45, to the primary crystallizer to maintain proper magna densities, and settled; clarified product brine from the settling section of the last crystallizer is sent, 46, to polishing filters, 47, as may be necessary. The filtered product brine, 48, leaves the filters at a temperature of approximately 7 to 17 degrees Fahrenheit. This brine is sent through the cooling sides of the primary crystallizer heat exchanger, 33, and the precooler, 30, and then exits from the precooler, 30, in stream, 50. A portion of the slurry in the final crystallizer is recirculated, 45, back to the primary crystallizer, 32, to maintain proper magna densities, and a clarified product stream, 46, exits at the selected temperature.

Although the foregoing description with respect to FIG. II has been given showing a multi-crystallizer system, one stage of crystallization will be effective in various embodiments of this invention depending on the amount of Glauber's salt to be crystallized and the specification of the sulfate ions required in the final product, both of which are controlled by the specific plant installation involved. Also, in the foregoing description, the recuperative refrigeration system is described as being a single stage system. Other sources of refrigeration recovery, for example, from the melting of the Glauber's salt can be recovered by installing additional stages of recuperative equipment. Furthermore, the foregoing description has been directed to one embodiment of this invention involving removing or control of sulfate ions in brine supplied by pipeline and return of depleted brine to and from brine wells. The methods of this invention are also applicable to other membrane cell systems, including those employing rock salt, solar salt or recovered salt. In these systems, salt dissolvers would replace the wells and salt dissolved would be replaced by more solid salt, and hence, there would be no loss of sulfate ions in the solution process. Since the unique combination of refrigeration and crystallization system in accordance with this invention returns essentially all sulfate ions to the dissolver, the level of sulfate ions in the raw brine would continue to build up to a saturation point of about 50 gpl sodium sulfate. Hence, some sodium sulfate decahydrate removed in the refrigeration and crystallization system would have to be removed from the system and sent to disposal. The higher the concentration of sulfate ions in the dissolving tank, the lower will be the solubility of calcium ions, but it is not necessary to maintain a maximum solubility of sulfate ions to achieve economic results in accordance with this invention. Depending upon the quality of the solid salt, a sodium sulfate level of about 20 to 30 gpl in the raw brine leaving the dissolver can be very effective in minimizing soluble calcium ions and will be easier to process in the refrigeration and crystallization system. Furthermore, those skilled in the art will appreciate that the systems of this invention can be adapted to not only removing sulfate ions but also other ions, such as chlorate, that may build up in recycle loops, depending on the operating conditions of the membrane cells and the solubilities of the ions.

It is to be understood that various modifications within the spirit and scope of my invention are possible, some of which have been referred to above, and although I have given detailed description of my invention by illustrating specific embodiments, I do not intend to be limited thereto, except as defined by the following claims.

I claim:

1. A method for reducing sulfate ion concentration from brine for electrolysis in a chlor-alkali membrane cell plant installation which comprises preparing a concentrated aqueous solution of salt to make a brine comprising sodium, chloride, calcium and sulfate ions, subjecting the brine to refrigeration and crystallization to precipitate Glauber's salt, mixing the so precipated Glauber's salt with the solution used to make the brine, thereby supressing the solution of sulfate ions from calcium sulfate contained in the salt used to make the brine.

2. A method in accordance with claim 1, wherein a source of salt is rock salt, solar salt, recovered process salt or brine well salt.

3. A method in accordance with claim 1, wherein the membrane cell plant installation is in pipeline communication with a brine well installation and wherein the brine is sent for electrolysis to the membrane cell plant installation in one pipeline and depleted brine from the membrane cell plant installation is returned to the brine well installation for resaturation with salt in another pipeline and wherein essentially all the sulfate ions in the brine are returned back to the brine well installation to maximize the concentration of sulfate ions in the brine well installation.

4. A method in accordance with claim 3, wherein the refrigeration and crystallization used to remove the Glauber's salt is located at the brine well installation.

5. A method in accordance with claim 3, wherein the refrigeration and crystallization used to remove the Glaber's salt is located at the membrane cell plant installation.

6. A method in accordance with claim 3, wherein the sulfate ion concentration in the brine being fed to the membrane cell plant installation is below about 4.7 gpl.

7. A method in accordance with claim 3, wherein the sulfate ion concentration in the brine being fed to the membrance cell plant installation is below 7 gpl and depleted brine and Glauber's salt solution being returned to the brine well installation is maintained at a pH range of about 7 to 11+.

8. A method in accordance with claim 3, wherein the calcium ion concentration of the brine emerging from the brine well installation is supressed by maintaining the sulfate ion concentration at an equilibrium whereby the sulfate ions that are lost as sodium sulfate in a cavity in the brine well created by a brining process are substantially equal to the sulfate ions associated with the calcium sulfate in the brine emerging from the wells.

9. A method for reducing sulfate ion concentration from brine comprising sodium, chloride, calcium and sulfate ions for electrolysis in a chlor-alkali membrane cell plant installation which comprises preparing a concentrated aqueous solution of salt to make brine, at a brine well installation in dual pipeline communication with the membrane cell plant installation, diluting said brine with water or depleted brine to bring the sodium chloride concentration to below about 24%, transmitting said brine in a pipeline to the membrane cell plant installation, subjecting the brine to refrigeration and crystallization to precipitate Glauber's salt, mixing the so precipitated Glauber's salt with depleted brine resulting from the membrane cell plant installation, adding make up water, either at the cell plant installation or at the brine well installation, to replenish that lost in the electrolysis process and to a cavity in the brine well. installation created by a brining process, and returning said mixture of depleted brine and Glauber's salt to the brine well installation in another pipeline for salt resaturation in the brine well installation.

10. A method for reducing sulfate ion concentration from brine comprising sodium, chloride, calcium and sulfate ions for electrolysis in a chlor-alkali membrane cell plant installation which comprises preparing a concentrated aqueous solution of salt to make brine, at a brine well installation in dual pipeline communication with the membrane cell plant installation, diluting said brine with water or depleted brine to bring the sodium chloride concentration to below about 24%, then subjecting the brine to refrigeration and crystallization to precipitate Glauber's salt, transmitting the brine so produced in a pipeline to the membrane cell plant installation; transmitting depleted brine resulting from the membrane cell plant installation in another pipeline to the brine well installation, mixing the precipated Glauber's salt with said depleted brine at the brine well installation, adding makeup water, either at the membrane cell plant installation or at the brine well installation, to replenish that lost in the electrolysis process and to a cavity in the brine well created by a brining process, and using said diluted mixture of depleted brine and Glauber's salt to dissolve salt in the brine well installation.

11. A method for reducing sulfate ion concentration from brine comprising sodium, chloride, calcium and sulfate ions for electrolysis in a chlor-alkali membrane cell plant installation which comprises preparing a concentrated aqueous solution of salt to make brine having about 24% sodium chloride content, in a dissolving tank employing a solid salt, subjecting the brine to refrigeration and crystallization to precipitate Glauber's salt, mixing the precipated Glauber's salt with depleted brine resulting from the electrolysis process, adding makeup water to replenish that lost in the electrolysis process, replenishing the solid salt as required by the use of the brine in the electrolysis process, returning said solution of depleted brine and Glauber's salt to a dissolver for reconcentration to about 24% salt content, and removing excess Glauber's salt from the refrigeration and crystallization over that needed to maintain the sulfate ion at substantially saturated concentration.

* * * * *

UNITED STATES PATENT AND TRADEMARK OFFICE
CERTIFICATE OF CORRECTION

PATENT NO.   : 5,028,302

DATED        : July 2, 1991

INVENTOR(S)  : John Rutherford and Raymond W. Ver Hoeve

It is certified that error appears in the above-identified patent and that said Letters Patent is hereby corrected as shown below:

On the title page, under item [19], change "Rutherford" to read --Rutherford et al.--; and in item [75], after "Raymond W." change "Ver Hove Hoeue to --Ver Hoeve--.

Signed and Sealed this

Fifth Day of January, 1993

Attest:

DOUGLAS B. COMER

*Attesting Officer*  *Acting Commissioner of Patents and Trademarks*